Figure 6:
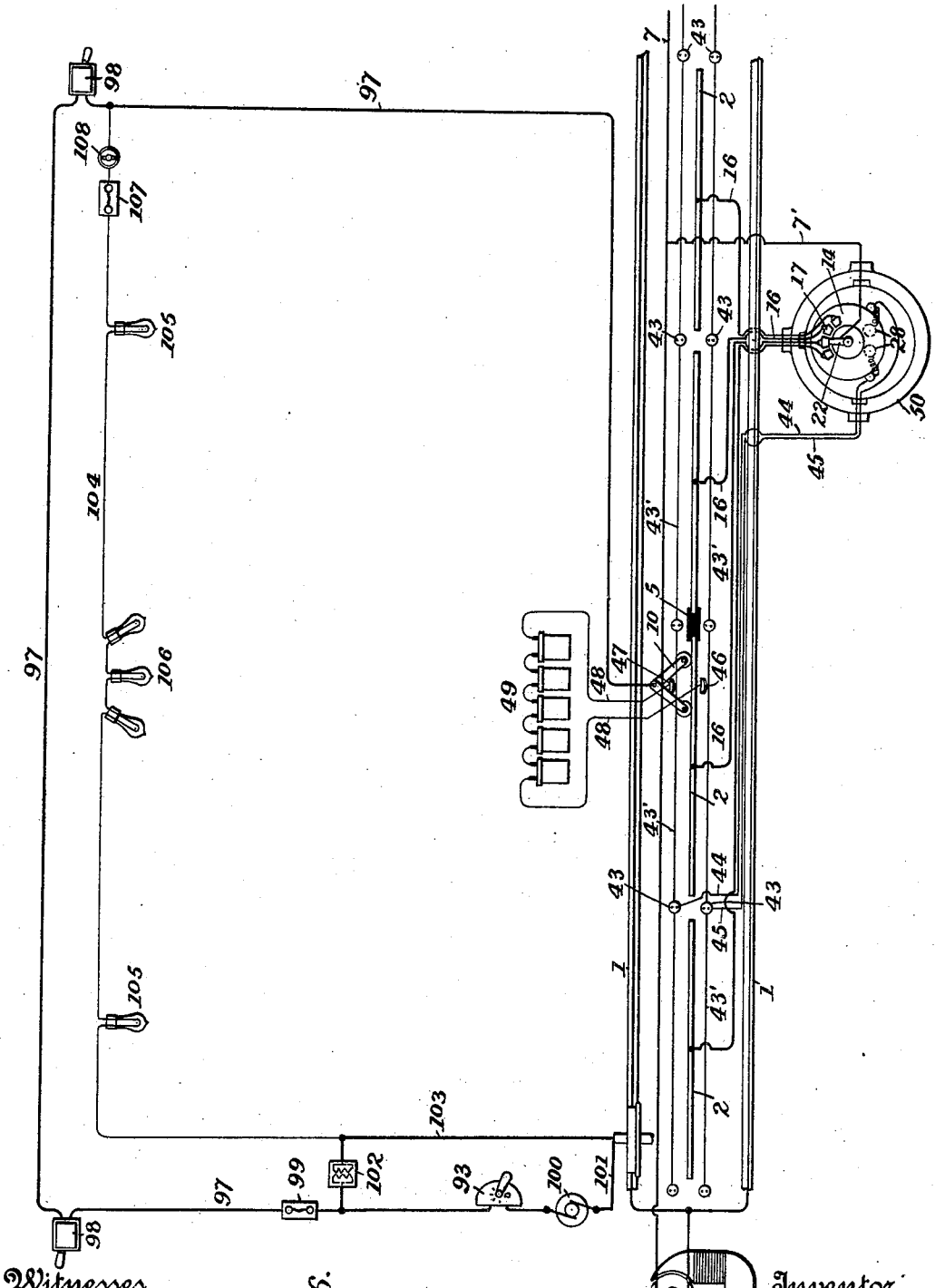

No. 613,708. Patented Nov. 8, 1898.
J. F. McLAUGHLIN.
ELECTRIC RAILWAY.
(Application filed May 2, 1896.)
(No Model.) 7 Sheets—Sheet 1.
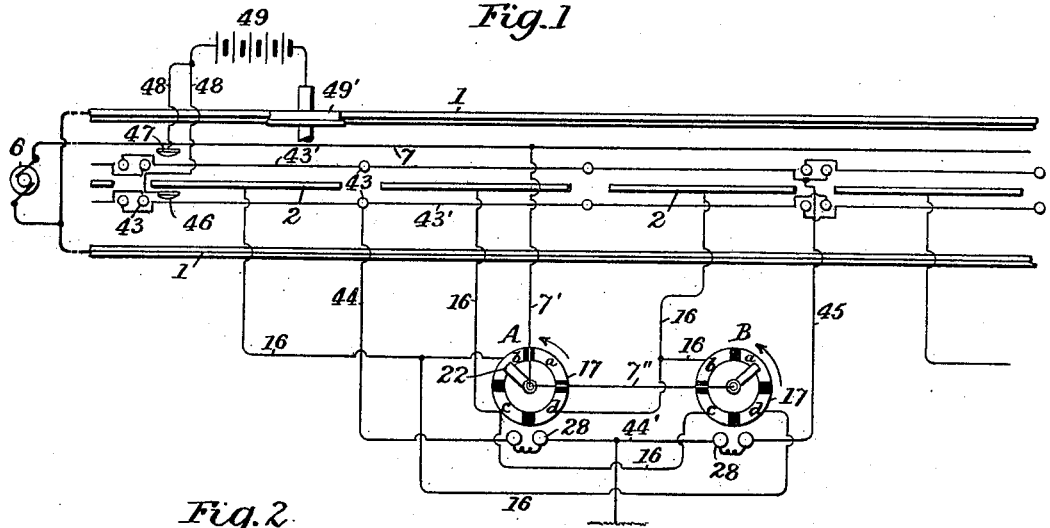
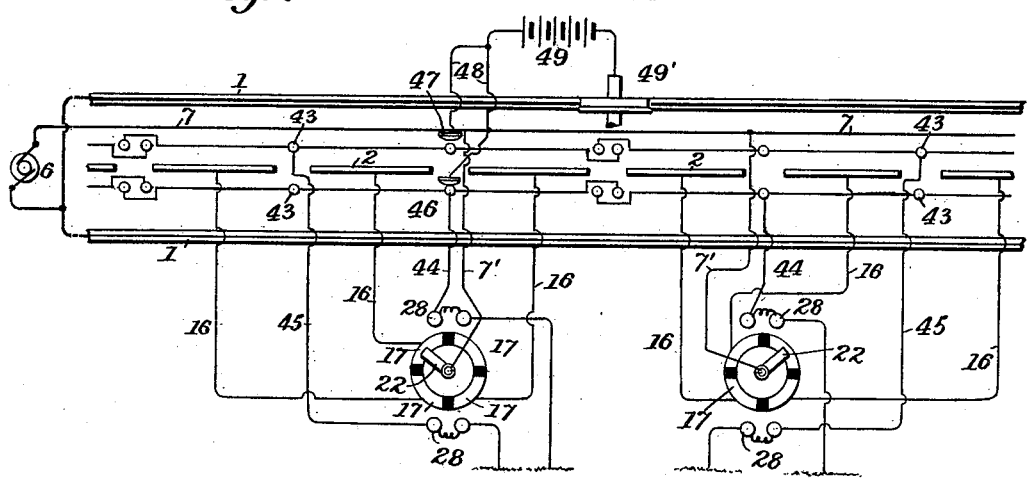
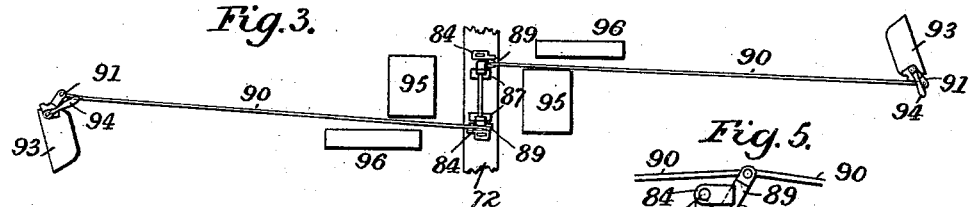
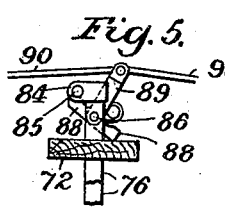
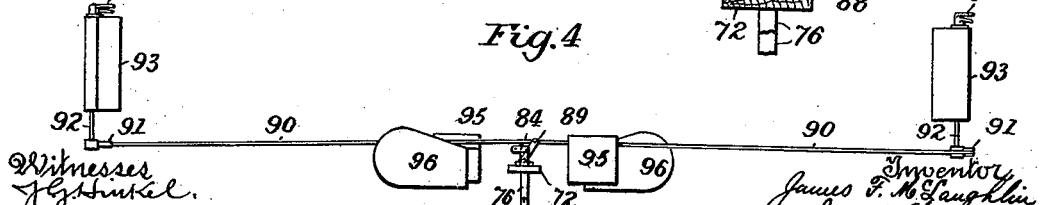
Witnesses
J. G. Hinkel.
F. J. Chapman.
Inventor
James F. McLaughlin
By Joseph Lyons
Attorney.
THE NORRIS PETERS CO., PHOTO-LITHO., WASHINGTON, D. C.

No. 613,708. Patented Nov. 8, 1898.
J. F. McLAUGHLIN.
ELECTRIC RAILWAY.
(Application filed May 2, 1896.)
(No Model.) 7 Sheets—Sheet 2.

Witnesses
J. G. Hinkel
F. F. Chapman

Inventor,
James F. McLaughlin,
By Joseph Lyons
Attorney

No. 613,708. Patented Nov. 8, 1898.
J. F. McLAUGHLIN.
ELECTRIC RAILWAY.
(Application filed May 2, 1896.)
(No Model.) 7 Sheets—Sheet 3.

Witnesses
J. G. Hinkel
F. J. Chapman

Inventor
James F. McLaughlin
By Joseph Lyons
Attorney

No. 613,708. Patented Nov. 8, 1898.
J. F. McLAUGHLIN.
ELECTRIC RAILWAY.
(Application filed May 2, 1896.)
(No Model.) 7 Sheets—Sheet 4.

Witnesses
J. G. Hinkel.
F. T. Chapman.

Inventor,
James F. McLaughlin,
By Joseph Lyons.
Attorney.

No. 613,708. Patented Nov. 8, 1898.
J. F. McLAUGHLIN.
ELECTRIC RAILWAY.
(Application filed May 2, 1896.)
(No Model.) 7 Sheets—Sheet 5.

Witnesses
J. G. Hinkel.
F. T. Chapman.

Inventor,
James F. McLaughlin,
By Joseph Lyons.
Attorney.

THE NORRIS PETERS CO., PHOTO-LITHO., WASHINGTON, D. C.

No. 613,708. Patented Nov. 8, 1898.
J. F. McLAUGHLIN.
ELECTRIC RAILWAY.
(Application filed May 2, 1896.)
(No Model.) 7 Sheets—Sheet 6.
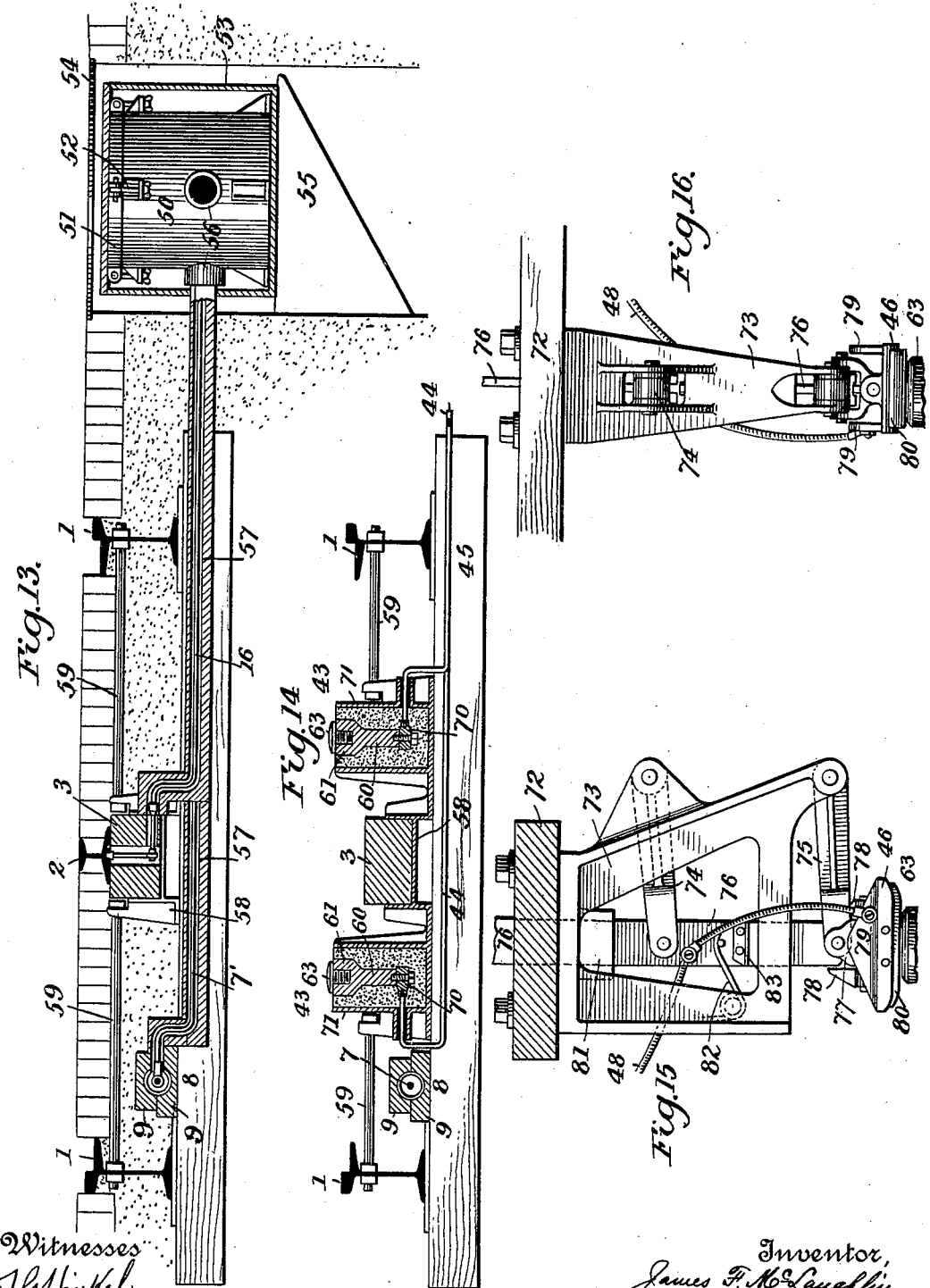

No. 613,708. Patented Nov. 8, 1898.
J. F. McLAUGHLIN.
ELECTRIC RAILWAY.
(Application filed May 2, 1896.)

(No Model.) 7 Sheets—Sheet 7.

Witnesses
J. G. Hinkel
F. T. Chapman

Inventor,
James F. McLaughlin,
By Joseph Lyons
Attorney.

THE NORRIS PETERS CO., PHOTO-LITHO., WASHINGTON, D. C.

UNITED STATES PATENT OFFICE.

JAMES F. McLAUGHLIN, OF PHILADELPHIA, PENNSYLVANIA.

ELECTRIC RAILWAY.

SPECIFICATION forming part of Letters Patent No. 613,708, dated November 8, 1898.

Application filed May 2, 1896. Serial No. 589,949. (No model.)

*To all whom it may concern:*

Be it known that I, JAMES F. McLAUGHLIN, a citizen of the United States, and a resident of Philadelphia, in the county of Philadelphia and State of Pennsylvania, have invented certain new and useful Improvements in Electric Railways, of which the following is a specification.

This invention has reference to improvements in electric railways of the type shown and described in Letters Patent No. 544,863, granted to me on August 20, 1895. In the railway shown in the said Letters Patent the current for driving the motors on the car is collected from a sectional conductor buried in the road-bed and having an exposed contact-face flush with the said road-bed. The sections of this sectional conductor are successively cut into and out of circuit with a main or supply conductor by means of switches buried in the road-bed, there being a switch for each section of the sectional conductor and electromagnets carried by each car for operating the switches. This necessitates special mechanism for shifting the magnets to compensate for curves and to permit the operating of the switches in proper order when the car is run in the reversed direction.

It is the object of the present invention to provide means whereby the sections of the sectional conductor are cut into and out of circuit in proper sequence, whether the car be running in one direction or the other, without using a separate switch for each section of the sectional conductor or switch-operating magnets upon the car.

The present invention consists of a railway having multiple switches, each controlling a group of successive sections of the sectional conductor and operated by an electromagnet included in a circuit having stationary terminals in the road-bed and movable terminals on the car adapted to complete the circuit to the switch-operating magnet at suitable intervals as the car moves along the track. The system is so constructed and timed that the sections of the sectional conductor are cut into and out of circuit, *seriatim*, as the car moves over them, and no more than two successive sections will be in circuit at any time.

The invention also consists in certain improvements in the electrical and mechanical devices which enter into the construction of the system.

All this is fully set forth in the following description, which is directed to the accompanying drawings, forming part of this specification, and in which—

Figure 7:
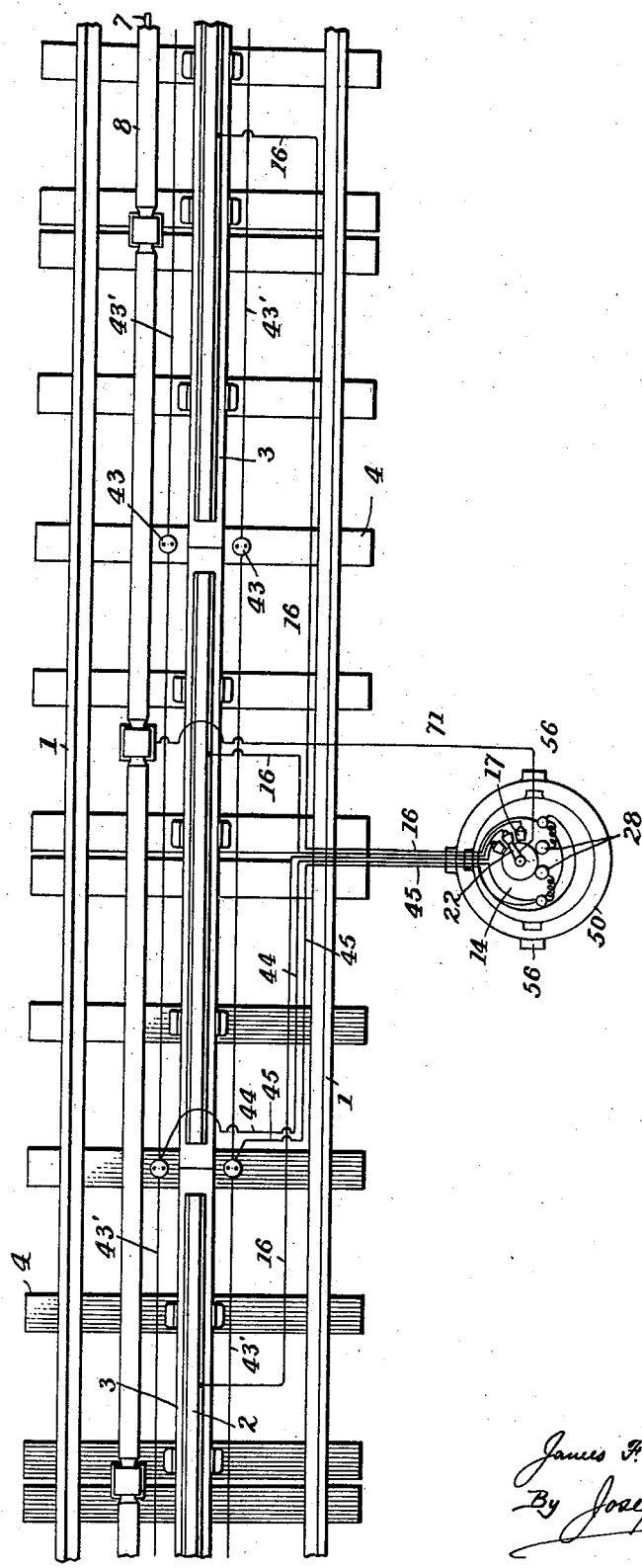
Figure 8:
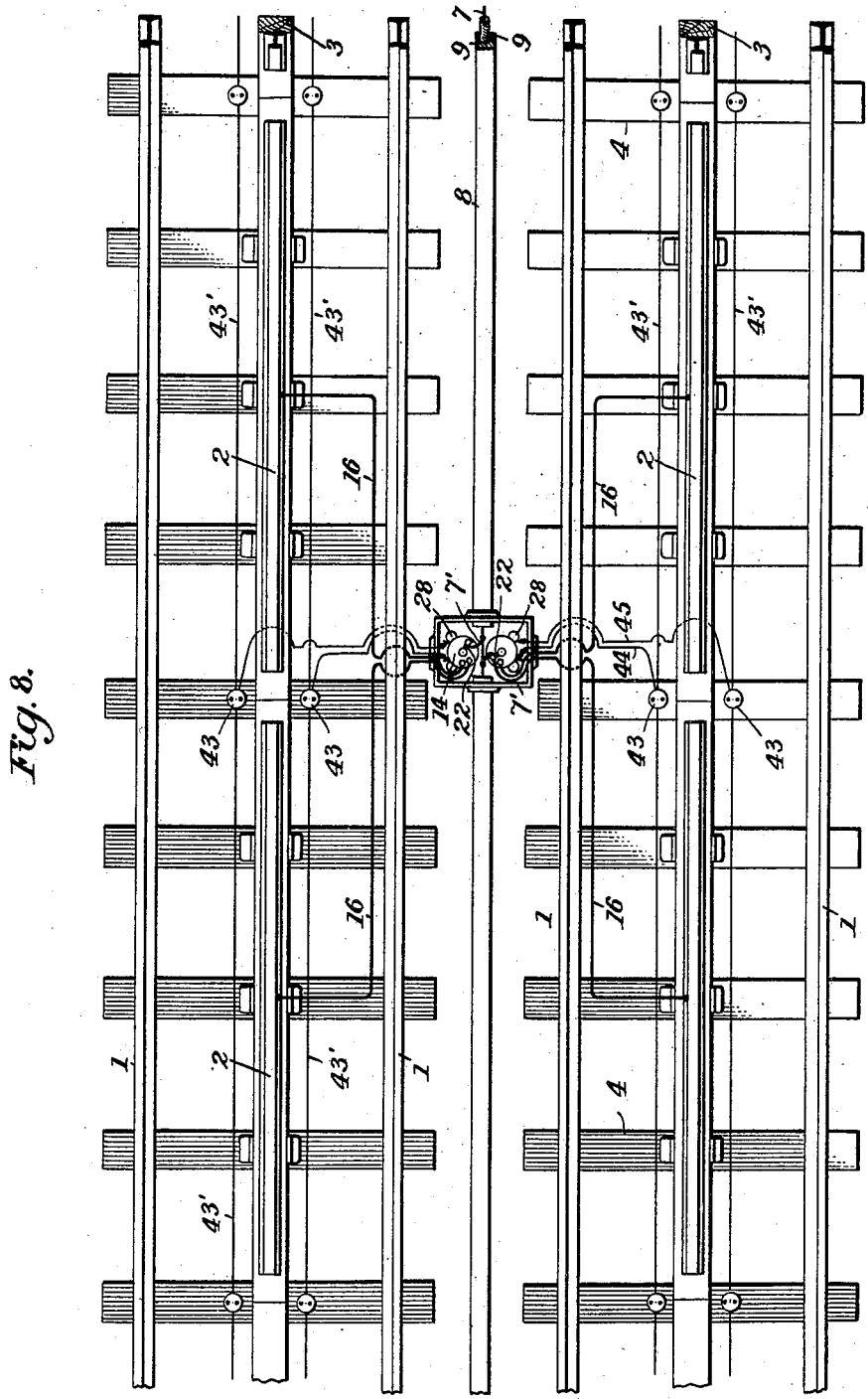
Figure 9:
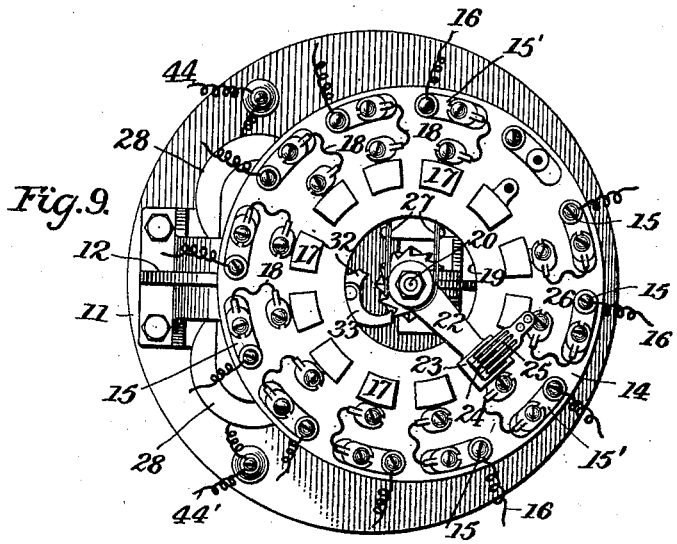
Figure 10:
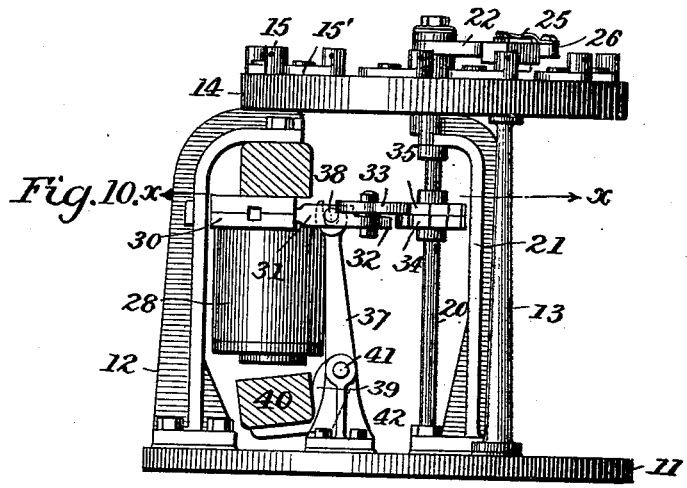
Figures 11, 12:
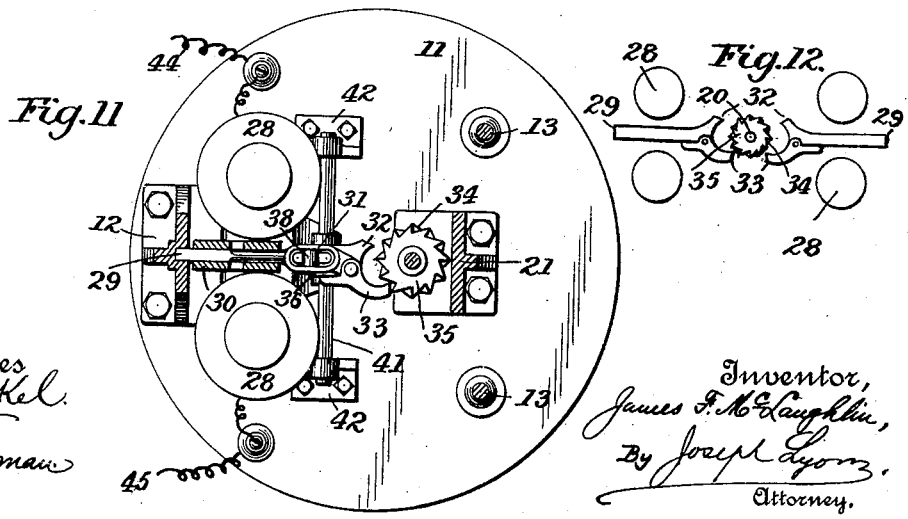
Figure 17:
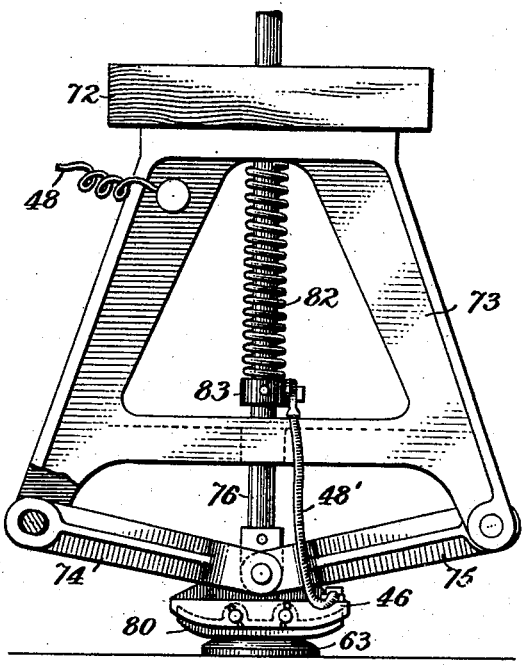
Figure 18:
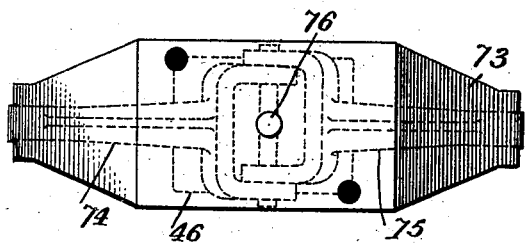
Figure 19:
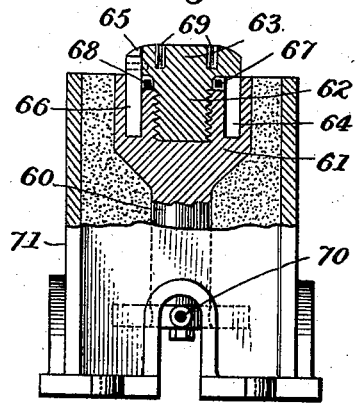

Figure 1 is a diagram illustrating one form of the improved system of electric railways. Fig. 2 is a diagram illustrating another form thereof. Figs. 3 and 4 are a plan and side elevation, respectively, of the contact-shoe supporting and controlling mechanism. Fig. 5 is a detail elevation of a portion of said mechanism. Fig. 6 is a diagrammatic view illustrating one form of the improved system of electric railways and also showing the motor-car circuits. Fig. 7 is a plan view, partly in diagram, of a single-track railroad illustrating one form of the invention. Fig. 8 is a similar plan view, partly in diagram, of a double-track road illustrating one form of the invention. Fig. 9 is a plan view of a multiple switch forming part of the invention. Fig. 10 is a side elevation, partly in section, of the same. Fig. 11 is a cross-section on the line *x x* of Fig. 5. Fig. 12 is a partly-diagrammatic view of a modified form of switch-operating devices adapted to the system illustrated in Fig. 2. Fig. 13 is a cross-section through the road-bed and cutting a manhole containing a multiple switch. Fig. 14 is a section of the road-bed at a point intermediate between the ends of two adjacent sections of the sectional conductor, the filling-in material of the road-bed being removed. Figs. 15 and 16 are a side and end elevation, respectively, of a contact device on the car for establishing the multiple-switch-operating circuit. Figs. 17 and 18 are side elevation and plan, respectively, of another form of contact device; and Fig. 19 is a section, partly in elevation, of a surface-plug included in the multiple-switch circuit.

Referring to the drawings, and more particularly to Figs. 1, 2, 6, 7, and 8, there is shown a track 1, midway between the rails of which is a sectional conductor composed of rails 2, supported, as shown in Figs. 7 and 8, upon stringers 3, laid upon the cross-ties 4, to which the track-rails are spiked. The adjacent ends of the sections 2 are separated by insulating material 5, as indicated in Fig. 6.

The rails 1 are connected in multiple arc to one terminal of a generator 6, the other terminal of which is connected to a conductor 7, which latter constitutes the main or supply conductor of the system. This conductor is incased in a sealed conduit 8, of any suitable form, laid upon the ties 4, between the track-rails, as shown in Fig. 7, or between two tracks, as shown in Fig. 8.

One form of conduit for the conductor 7 is shown in Figs. 8, 13, and 14 and consists of two strips 9 9, placed one on the other and having the meeting faces hollowed out to receive the conductor 7, together with its insulating-wrapping. The strips 9 may be of wood or terra-cotta or other suitable material, and when the road-bed is finished the conduit 8, with the inclosed conductor 7, is completely covered by the usual filling-in material and surface layer.

Adjacent to or between the tracks and located at intervals along the roadway are multiple switches, one of which is shown in detail in Figs. 9, 10, and 11. These switches are arranged to couple a number of sections 2 in succession to the main conductor 7, the construction being such that a section is cut out of circuit just as the next succeeding one is cut into the circuit. In order to prevent any interruption of the motor-circuit, each car is provided with a trolley 10, (see Fig. 6,) having contacts so arranged that the space between the adjacent ends of two sections 2 will be bridged by this trolley, the same as in the structure shown in my aforesaid Letters Patent.

The multiple switch is connected to and controls a number or group of successive sections, and in the structure shown in Fig. 9 the switch is assumed to control eleven successive sections; but it will be understood that this number may be larger or smaller, according to circumstances.

Before explaining the manner in which the switch operates to cut the sections 2 into and out of circuit with the conductor 7 I will first describe its structure, as shown in Figs. 9, 10, and 11.

Upon a base-plate 11 are erected a standard 12 and two posts 13 13, supporting a disk 14, of slate or some other suitable insulating material. On top of this disk 14 and arranged in a circular series near its outer edge are a number of binding-posts 15, each receiving a conductor 16, coming from a section 2 of the sectional conductor. (See Figs. 1, 2, 6, 7, and 8.) Concentric with the series of binding-posts 15 is a circular series of segmental contact plates or blocks 17, each block being connected to a lateral extension 15′ of the corresponding binding-post 15 by a fuse-strip 18.

The center portion of the disk 14 is removed to form a circular opening 19, through which extends the upper end of an upright shaft 20, which is central to the circular series of contact-blocks 17. The shaft 20 is stepped at its lower end and journaled near its upper end in a standard 21, erected on the base-plate 11, and at the upper end the shaft carries a laterally-extending arm 22, terminating in a rectangular frame 23, in which is mounted a brush 24, made up of a number of conducting-blocks. The arm 22 is of such length that the brush 24 will ride over and make contact with the blocks 17, and the said brush is long enough to bridge the intervals between the plates, so that the circuit will not be broken as the brush is moved from plate to plate in the manner hereinafter described. The conducting-blocks are pressed against and into good electrical contact with the plates by means of spring-fingers 25, joined at one end and there secured to a lateral extension 26 of the frame 23. The switch-arm 22 is keyed or otherwise fixed to the shaft 20 to move therewith, and current is conveyed to this arm by means of brushes 27, supported by the disk 14 and bearing upon a collector-ring on the shaft in electrical connection with or forming part of the arm 22. The brushes 27 are in electrical connection with the main conductor 7 by means of a branch conductor 7′. (Shown in Figs. 1, 2, 6, 7, and 8.)

The standard 12 has its upper end bent over at right angles to the upright portion thereof, and to this overhanging portion of the standard there is secured a downwardly-projecting electromagnet 28 of the horseshoe type. Between the two coils of this magnet and arranged under the yoke-piece thereof is a sliding rod 29, having an extended bearing in a box 30, fixed to the under side of the yoke-piece. The rod 29 is squared for a portion of its length, as shown, and the bearing is similarly shaped, so that the rod cannot turn. Outside the box the rod is formed into a frame or yoke 31, beyond which it terminates in a fixed pawl 32 and carries a longer pivoted pawl 33 in opposition to and in a plane above the fixed pawl. The pawl 32 is arranged to engage the teeth of a ratchet-wheel 34, fixed on the shaft 20, and the pawl 33 is arranged to engage the teeth of another ratchet-wheel 35, also fixed on the shaft 20 above the ratchet-wheel 34, but having its teeth projecting in the contrary direction. Now if the rod 29 is moved forward the pawl 33, which, as before stated, is longer than the pawl 32, will engage a tooth of the ratchet-wheel 35 and cause the shaft 20 to be rotated a distance equal to the length of the ratchet-tooth. The parts are so proportioned that when this has been accomplished the pawl 32 will then engage a tooth on the ratchet-wheel 34, and since the teeth on this ratchet-wheel are in opposition to those of the ratchet-wheel 35 further movement of the rod 29 and of the shaft 20 is prevented. The pawl 33 therefore may be called the "operating-pawl" and the pawl 32 the "stop" or "back" pawl. When the rod 29 is drawn backward, both pawls are removed from engagement with the ratchet-wheels, and the pawl 33 will be in a position to engage the next succeeding tooth of the ratchet-wheel 35 when the rod 29 is again moved forward. The pawl 33 is maintained in operative relation to the teeth of the ratchet-wheel 35 by means of a spring. (Indicated in Fig. 11 by the single line 36.) The rod 29 is operated by means of a lever which I will call an "armature-lever." One arm 37 of this lever is bifurcated at the upper end and enters the frame or yoke 31, where it embraces an antifriction-roller 38, journaled in said frame. The other arm 39 of the armature-lever carries an armature 40 in inductive relation to the poles of the magnet 28. This lever is fast upon a rock-shaft 41, which in turn is journaled at its ends in two bearings 42, secured to the base-plate 11.

It will be seen that when the magnet 28 is energized the armature 40 is attracted, moving the armature-lever in a direction to force the pawls 32 and 33 into engagement with the ratchet-wheels, thereby causing the shaft 20 to rotate a distance equal to the length of a tooth. This movement of the shaft is sufficient to cause the brush 24 on the arm 22 to pass from one contact plate or block 17 to the next succeeding one. When the magnet is deënergized, the weight of the armature 40 is sufficient to return the armature-lever and pawl-arm 29 to the first position; but of course a spring can be used for this purpose instead of depending upon gravity. One means I use for coupling the magnet 28 to a source of current-supply at the proper intervals is illustrated diagrammatically in Fig. 1, and in the following description of this part of the invention special reference is had mainly to Fig. 1, though the devices employed are in part shown in other figures of the drawings.

In the system shown in Fig. 1 there are two interconnected multiple switches A B, such as shown in Fig. 9, both controlling the same group or series of sections 2, but so arranged as to cut the sections into and out of circuit in opposite order. Buried in the road-bed, but with the upper ends exposed, are pairs of plugs 43, located on each side of and about midway between the adjacent ends of the conductor-sections 2. All the plugs 43 on one side of the group of conductor-sections 2 controlled by two interconnected multiple switches are coupled together in series by conductors 43', and those on the other side are also coupled together in series by other conductors 43'. One series of plugs is connected by a conductor 44 to one terminal of the magnet 28 of the switch A, and the other series of plugs is connected by a conductor 45 to one terminal of the magnet 28 of the switch B. The switch-arm 22 of the switch A is connected to the main 7 by a branch conductor 7' and to the switch-arm of the switch B by another branch conductor 7''. It will be observed that these two switches A and B, as shown in Fig. 1, have only four contact-plates 17—that is, one idle or open-circuit plate and three active plates—connected by conductors 16 to the respective conductor-sections 2; but it will be understood that this is only illustrative and for the purpose of simplifying the drawings and that a much larger number of contact-plates may be used, in which case a correspondingly-larger group of sections 2 will be controlled by the switches A B. The idle contact-plates are designated by the letter $a$, and the active contact-plates by the letters $b$, $c$, and $d$. The contact-plates $b$ of both switches are connected by branch conductors 16 to the same section 2, and the contact-plates $c$ and $d$ are likewise connected to the succeeding sections 2 in proper order. Each car carries two contact-shoes 46 47 on opposite sides of the collecting-trolley 10. (See Fig. 6.) One of these contact-shoes is in line with one series of plugs 43 and the other shoe is in line with the other series of plugs, and each shoe is so mounted that it may be lowered until close enough to the road-bed to make contact with its series of plugs 43, or it may be elevated so as to ride over the same out of contact therewith. The mounting, however, is so constructed that when one shoe is lowered the other is elevated, and therefore only one shoe at a time can make contact with the plugs in the road-bed. The mechanism used for effecting this movement of the contact-shoes is described hereinafter with reference to Figs. 3, 4, and 5 and other figures of the drawings. Both shoes 46 47 are connected by conductors 48 to the same pole of a battery 49 or other source of electric energy carried by the motor-car, and this battery has its other pole grounded through a car-wheel 49'. The magnets 28 of the two switches A and B have a common ground connection through a conductor 44'. When a shoe is lowered so as to make contact with its series of plugs, the circuit is completed every time the shoe passes over a plug from the battery 49 by the car-wheels 49' and ground to one of the magnets 28, thence through the conductor 44 or 45 to one of the plugs 43, and by the shoe 46 or 47 and conductor 48 back to the battery. Now supposing that it is the shoe 46 that is lowered and that the car is traveling toward the right in Fig. 1, then the shoe 46 will have made contact with the first of its series of plugs 43, and the switch-arm of the switch A will have moved from the idle-plate $a$, on which it normally rests, to the first contact $b$. The first section 2 of the sectional conductor will therefore be coupled to the main 7 by the switch A. As soon as the shoe 46 reaches the second plug 43 of its series the switch-arm will be moved to the contact-plate $c$, cutting in the second section 2 and cutting out the first section. The third section 2 is cut in in like manner, and finally, when the shoe 46 makes contact with the last of this group of plugs 43, the switch-arm of switch A is moved onto the idle-plate and remains there until another car passes. If the direction of travel of the car be toward the left in Fig. 1, the shoe 47 is lowered and the shoe 46 elevated. This will cause the switch B to be operated in like manner as was switch A, but in such direction as to couple the sections 2 to the main 7 in reverse order.

In Fig. 2 the two switches A B are replaced by a single switch, such as has already been described with reference to Figs. 9, 10, and 11, but having two sets of pawls 32 33, each set carried by a rod 29, and there are two magnets 28 for independently actuating the sets of pawls. This structure is indicated in Fig. 12, from which it will be seen that the actuating-pawl 33 on one rod 29 is in operative relation to the ratchet-wheel 35 while the other actuating-pawl 33 is in operative relation to the ratchet-wheel 34. From this it is evident that when one magnet 28 is energized the switch-arm will be rotated in one direction and couple the sections 2 in succession to the main 7, and when the other magnet 28 is energized the direction of rotation of the switch-arm and the order in which the sections 2 are coupled to the main 7 are reversed. The operation of this switch is the same as that of the two interconnected switches shown in Fig. 1, as will be at once apparent, and therefore need not be set forth herein. In order to maintain the motor-circuit as the car passes from group to group of conductor-sections 2, the terminal plugs 43 of contiguous groups are brought into close relation and the circuits thereof overlap, as indicated in Figs. 1 and 2, so that the last section 2 of a group is not cut out of circuit until after the first section 2 of the next succeeding circuit is cut into circuit.

Referring again to Fig. 13, the multiple switch is there shown in a manhole and inclosed in a cylindrical casing 50, provided with a removable cover 51, secured to the casing by fastening devices 52 of any suitable design. The multiple switch and its casing are contained in a box 53, the cover of which, as well as the cover of the casing, may, if desired, be transparent, so that the interior may be seen at once after the manhole-cover 54 is removed. The casing 50 rests upon a bracket 55 in the manhole, which latter may be located either at one side of the track in a single-track road or between the tracks in a double-track road. The casing 50 has flanged openings 56 for the passage of the conductors 7' and 16, and the box 53 is perforated for the passage of terra-cotta or other conduits 57, in which the various conductors are laid and which are buried beneath the surface of the road-bed. In order that the sectional conductor 2 may be kept in alinement with the rails 1, the stringers 3 rest in chairs 58, connected by tie-rods 59 to the rails.

In Fig. 14 there is shown a pair of plugs 43, and in Fig. 19 one of these plugs is shown in greater detail. I will now describe the construction of the plugs, referring more especially to Fig. 19. The plug consists, essentially, of a shank 60, expanded at one end into a head 61, centrally in which is a threaded socket receiving a screw-pin 62, formed on a contact-block 63, which latter constitutes the wearing end of the plug and which may be removed when worn and renewed at will. Around the threaded socket formed in the head 61 are a number of smaller sockets 64, and in the contact-block 63 is a notch 65, which can be brought coincident with one of the sockets 64, in which position the block 63 is held by a locking-pin 66. Since the notch 65 may not always exactly coincide with a socket 64 when the block 63 is screwed tightly in place I countersink the head 61 around the threaded socket therein, and in the space 67 thus formed I place a spring-washer 68, which will in such case maintain the contact-block 63 in good electrical contact with the head 61. The upper edge of the contact-block 63 is rounded off, as shown, so as not to present any sharp angles to the contact-shoes 46 47, and two small holes 69, drilled in the top of the contact-block 63, are provided for the application of a tool for screwing up or unscrewing the said block. Secured to the lower end of the shank 60 is a connector 70, having two diametrically opposite receiving-sockets for the ends of the conductors 43'. One pair of plugs 43 in each group will each have a connector 70, provided with a third socket for the reception of the terminals of the conductors 44 or 45, as the case may be. Each complete plug 43 is contained within a case 71, filled with some suitable insulating material, as indicated, and this case 71 has two openings for the passage of the conductors 43', and in some cases three openings when the conductor 44 or 45 is also connected to the plug.

The casing 71 may be a separate casing, as indicated in Fig. 19, or it may be cast in one piece with one of the chairs 58, supporting the stringers 3, in which case the entire casting would be formed as indicated in Fig. 14.

I hang the shoes 46 47 from the car-truck frame, because this frame maintains a practically constant relation to the road-bed, and I may so construct the mounting for these shoes that they will have a slight up-and-down play and in some instances a very limited lateral swing that will allow them to adapt themselves to any irregularities in the placing of the plugs. One form of mounting for these shoes is shown in Figs. 15 and 16. To the under side of a cross-beam 72 of the car-truck is secured a casting of the shape shown and constituting the frame 73, supporting a shoe 46 or 47, it being understood that there are two of these frames and two shoes on each car. Journaled, each at one end, in suitable bearings in this frame are two parallel arms 74 75, carrying at their other ends an upright bar or rod 76. Pivoted to the lower end of this bar 76 is a small yoke-piece 77, arranged to swing around its pivot in the plane of the travel of the car, but limited in its movement by fingers 78, which engage the bar 76. To the lower end of this yoke 77 the contact-shoe is pivoted so as to swing in a plane at right angles to that of the said yoke 77, and the extent of the swing of this shoe is limited by ears 79, formed on each side thereof and engaging the yoke 77. The contact-shoe is provided with a removable wearing-face 80, which may be renewed when worn. The upper end of the bar 76 enters a guiding-socket 81 and passes upward through the same and above the beam 72 and is urged downward by a spring 82. This downward movement is limited by a stop 83 on the bar engaging a fixed portion of the frame 73. The conductor 48, coming from the battery 49, is connected to the bar 76, and a continuation of the conductor passes to the contact-shoe, to which it is electrically connected, as shown. With this arrangement it will be seen the contact-shoe will immediately adapt itself to each plug as it passes over it and will therefore make good electrical contact therewith.

In Figs. 17 and 18 I have shown another form of mounting for the shoe, and in this case the two arms 74 75 have their journaled ends arranged oppositely in the frame 73, while their other ends are connected to each other and to the bar or rod 76 by the same pivot-pin. The contact-shoe is also pivotally connected to the bar 76 by the same pivot-pin that connects the arms 74 and 75 thereto, and in this structure the shoe rocks in the direction of the line of travel only. The conductor 48, coming from the battery, is in this structure connected directly to the frame 73, and another conductor 48' connects the bar 76 to the contact-shoe.

The means for controlling the shoes 46 47 is shown in Figs. 3, 4, and 5, to which reference is now had. In these figures the mechanism shown in Figs. 15 or 17 for supporting and guiding the bar 76 is omitted; but it will be understood that such mechanism may be used. The bar 76 extends above the cross-beam 72 and terminates in a head 84, having in it a laterally-extending pin 85. The heads on the two bars 76 extend in opposite directions, as shown in Fig. 5, and between these bars there is a rock-shaft 86, supported on bearing-blocks 87 on the cross-beam 72. On this rock-shaft are two oppositely-projecting fingers 88 88, one arranged to engage the pin 85 on one bar 76 and the other arranged to engage the pin 85 on the other bar. When the shaft 86 is rocked, one of the fingers 88 will lift one of the bars 76, while the other finger 88 will be lowered, allowing the corresponding bar 76 to drop either by gravity or under the action of the spring 82 when the latter is employed. On the rock-shaft 86 are two arms 89, each connected by a rod 90 to an arm 91 on the lower end of an upright shaft 92, passing upward through a controller-box 93 and having at its upper end a handle 94, by which it is manipulated. There are two controller-boxes, one at each end of the car, and the arrangement is such that the motorman can manipulate the mechanism to lower the proper shoe from either end of the car.

In Figs. 3 and 4 two handles 94, one at each end of the car, are shown; but in practice only one handle is used, and this handle is changed from one end of the car to the other, as occasion requires.

In Figs. 3 and 4 the motor-casings 95 and gear-casings 96 are illustrated in diagram.

The circuit connections on the car are illustrated diagrammatically in Fig. 6 and are the same as those of any ordinary motor-car receiving current from an exterior source. The trolley 10 is connected by a conductor 97, through switches 98 98 at each end of the car and safety-fuse 99, to the usual controller-box 93, (one at each end of the car,) from whence the circuit may be completed to the motor or motors 100, and through these by a conductor 101 to the car-wheels and track, returning by the latter to the generator 6. The motor is protected, as usual, by a lightning-arrester 102, connected to ground by a conductor 103, connected to the car-wheels. In a multiple-arc branch 104 of the main circuit on the car is included the usual pilot-lamps 105 105 and one or more clusters 106, the said branch circuit 104 including the usual fuse-strip 107 and switch 108.

It will be seen that by the present invention I reduce the number of underground switches to a minimum, since I need only use one or two to an ordinary city block or square, while the plugs in the road-bed are practically unnoticeable.

While I have described the switch-operating circuit as fed by a battery on the car, it is at once evident that this circuit may be fed from a branch of the motor-circuit.

In Figs. 6, 7, and 8 the circuit connections, as shown, are such that the car can be run in one direction only, and both shoes 46 47 must be in contact with both series of plugs 43 at the same time. However, I prefer the system shown in Figs. 1 and 2, and am by no means confined to the systems illustrated in the said Figs. 6, 7, and 8.

Having thus fully described the invention, what I claim, and desire to secure by Letters Patent, is—

1. In an electric railway, the combination with a main conductor and a sectional working conductor, of multiple switches, each arranged to couple a group of successive sections of the working conductor in proper sequence to the main conductor, and means for operating the switches by the passage of a car over the groups of sections controlled by said switches, substantially as described.

2. In an electric railway, the combination with a main conductor and a sectional working conductor, of multiple switches each arranged to couple a group of successive secquence to the main conductor, two switch-actuating mechanisms for each group of conductor-sections, two normally open electric circuits for each group of sections and each circuit controlling one of the switch-actuating mechanisms, and a normally open circuit on a car, including a source of current and arranged to be coupled with either of the switch-controlling circuits, substantially as described.

3. In an electric railway, the combination with two series of exposed circuit-terminals in the line of travel of the cars, two contact-shoes on each car, in line with the exposed circuit-terminals and mounted to be moved vertically, and means for moving one shoe into position to make contact with one series of circuit-terminals and the other shoe into a position where it will be out of contact with the other series of circuit-terminals, substantially as described.

4. In an electric railway, the combination with two series of exposed circuit-terminals, of two traveling shoes, each in line with a series of circuit-terminals and mounted for vertical movement, and a system of links and levers arranged to lift either shoe to a position where it will be out of contact with its series of circuit-terminals while at the same time the other shoe is lowered into a position to make contact with its series of circuit-terminals, substantially as described.

5. In an electric railway, the combination with a main conductor and a sectional working conductor, of a switch consisting of a circular series of contact-plates each connected to a section of a group of working-conductor sections, a switch-arm connected to the main conductor and arranged to make successive contact with the contact-plates, two pawl-and-ratchet mechanisms for moving the switch-arm in opposite directions, and an electromagnet for each pawl mechanism, and connections between the magnet-armature and the respective pawl mechanism, for actuating the switch-arm each time a magnet is energized, substantially as described.

6. In an electric railway, the combination with a car and exposed contacts in the road-bed in the line of travel of the car, of a contact-shoe carried by the car, and a mounting for the shoe comprising a vertically-moving bar or rod and a universal-joint connection between the shoe and the lower end of the rod, substantially as described.

7. In an electric railway, an exposed circuit-terminal consisting of a plug in the road-bed, composed of a body portion, a removable contact-face, and locking mechanism for holding the latter against accidental removal, substantially as described.

8. In an electric railway, an exposed circuit-terminal consisting of a plug in the road-bed composed of a body portion, a removable contact-face, locking mechanism for holding the latter against accidental removal, and a spring-washer interposed between the removable contact-face and the body portion, substantially as described.

9. In an electric railway the combination with a main conductor, a sectional working conductor, and multiple switches, each arranged to couple a group of successive sections of the working conductor in proper sequence to the main conductor, of means for operating the switches, comprising normally open circuits including the multiple switches and having exposed circuit-terminals in the road-bed, distinct from the sectional working conductor, and a normally open circuit on the car, including a source of current and arranged with circuit-terminals adapted to make momentary contact with the exposed circuit-terminals of the switch-circuit, to form, intermittently, one closed circuit, substantially as described.

In testimony whereof I have signed my name to this specification in the presence of two subscribing witnesses.

JAMES F. McLAUGHLIN.

Witnesses:
 EDWARD A. FISCHER,
 C. H. CHADBOURNE.